July 24, 1956
A. B. BOOTH ET AL
2,755,594
MINNOW TRAP
Filed April 27, 1953
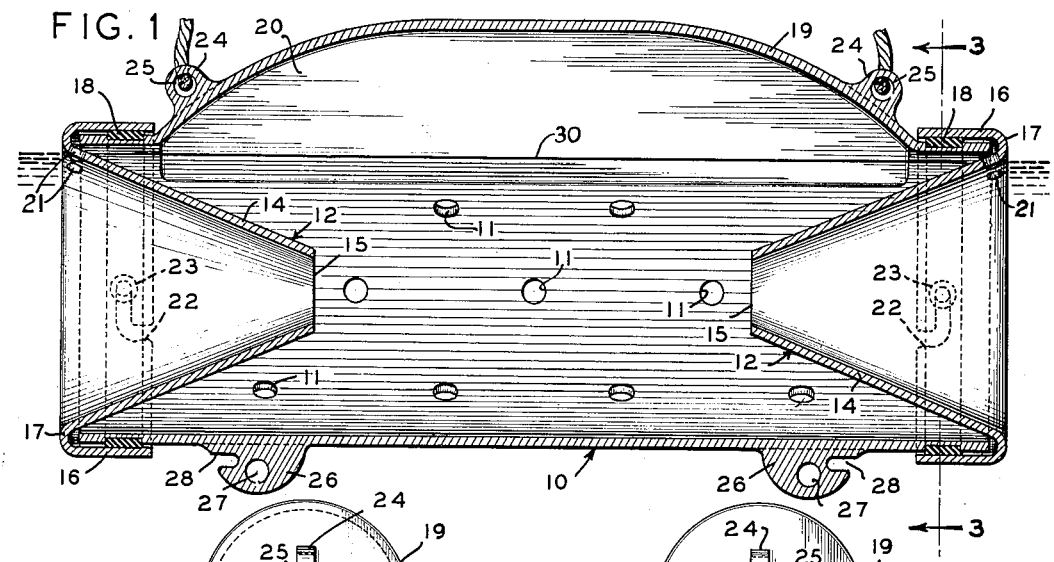
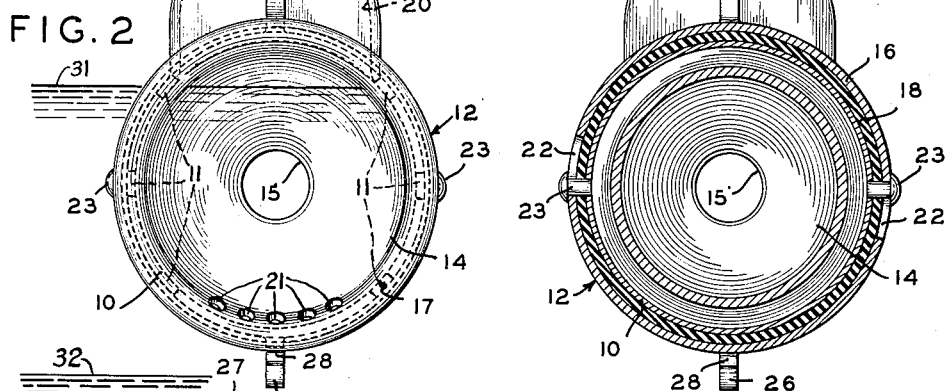
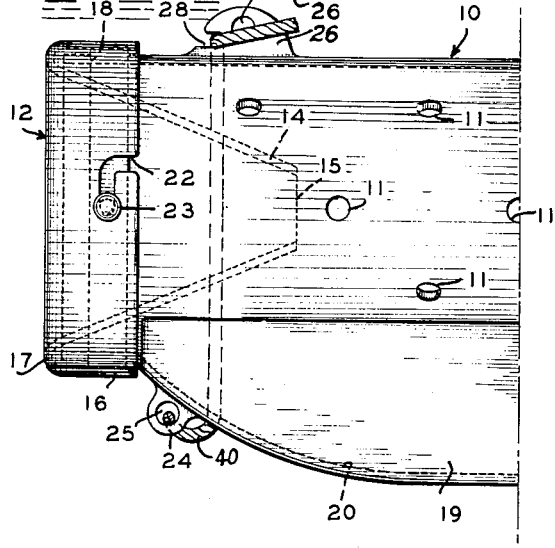
INVENTORS
ANDREW B. BOOTH
HARRY L. BOOTH
ATTORNEY ated July 24, 1956

2,755,594

MINNOW TRAP

Andrew Bradford Booth and Harry Lee Booth,
New Orleans, La.

Application April 27, 1953, Serial No. 351,369

8 Claims. (Cl. 43—100)

This invention relates to fishing equipment or tackle, and more particularly to a fish trap, and more specially to a minnow trap.

This invention is an improvement over the minnow trap shown and described in our co-pending application, Serial Number 324,692, filed December 8, 1952.

The object of the invention is to provide a minnow trap which is constructed so that it can be adjusted whereby the trap will float in the water or will sink to any desired depth as desired.

Another object of the invention is to provide a minnow trap which includes a pair of removable end members that are connected to the main body of the trap by an air tight joint whereby the end members can be removed when the trap is to be cleaned out, the trap being adjustable or rotatable so that the trap can be caused to float or sink as desired.

A still further object of the invention is to provide a minnow trap which is provided with an air chamber on the top thereof, whereby the air chamber will permit the trap to float when desired, the trap adapted to be made of clear transparent material, and wherein the end members can be removed when the minnows or other fish in the trap are to be removed.

Other objects and advantages will be apparent in the course of the following description.

In the accompanying drawings, forming a part of this application and in which like numerals are used to indicate the like parts throughout the same—

Fig. 1 is a longitudinal sectional view through a minnow trap illustrating one embodiment of the present invention;

Fig. 2 is an end elevational view of a modification of Fig. 1 in which the end members are rotated relative to the body of the trap so that the openings in the end member are at the bottom of the trap and the water level in the trap is determined by the uppermost openings in the body member.

Fig. 3 is a vertical sectional view taken on line 3—3 of Fig. 1; and

Fig. 4 is a fragmentary elevational view of the invention in inverted position so that the trap may be caused to sink, a suitable arrangement of lines to effect rotation of the trap being illustrated.

Referring in detail to the drawings, the numeral 10 designates a body member which may be fabricated of any suitable material, such as a clear transparent plastic material. The body member is provided with a plurality of openings 11 and the ends of the body member 10 are open for a purpose to be later described. Detachably mounted on each end of the body 10 is an end member 12. Each of the end members 12 has the same construction and each includes a central portion 14 which converges inwardly, Figures 1 and 4, and the inner end of each of the end members 12 is open as at 15. The end members 12 further include an annular rim or flange 16 which surrounds a portion of the body member 10.

The rim 16 is connected to the inwardly extended central portion 14 by a curved section 17.

A means is provided for insuring that there is an air tight joint between the end members 12 and the body member 10. This means comprises a resilient or rubber band 18 which is interposed between the rim 16 and the body member 10.

The body member 10 is further provided with an enlarged portion 19 which defines within the body member a float chamber 20. The end members 12 are further each provided with a plurality of apertures 21, Fig. 2. The body member 10 can be rotated to any desired position in the body of water, so that the apertures 21 can be set to let air or water into the body member 10 whereby the trap will either float or sink, depending upon the position of the apertures 21 with respect to the water level. The water line in Fig. 1 is indicated by the numeral 30.

A means is further provided for detachably connecting each of the end members 12 to the body member 10 and this means comprises a pair of L-shaped bayonet slots 22 which is arranged in each of the end members 12, Fig. 4. A pair of rivets or pins 23 extends from each end of the body member 10 and the pins 23 are adapted to be engaged in the slots 22 for preventing accidental disengagement of the end members 12 from the body member 10. Extending from the upper end of the body member 10 is a pair of ears 24 which are each provided with an opening or aperture 25 therein, whereby a suitable line or cable can be arranged in engagement with the openings 25 for suspending the minnow trap in the water. Extending from the opposite side of the body member 10 is a pair of lugs 26 which are each provided with an aperture 27, which serves a purpose to be later described. Each of the lugs 26 is provided with a groove or cutout 28.

From the foregoing it is apparent that a trap has been provided which is an improvement over the minnow trap shown and described in our co-pending application Serial Number 324,692. The trap can be used from a boat or river bank and can be adjusted so that it will rest on the body of water, or it will float or sink to any desired depth by regulating large corks which may be arranged on the line above the trap. Further, the removable cone-shape end members are fitted on the ends of the body members 10 with an air tight joint due to the provision of the rubber bands 18, and these end members 12 can be removed when the body is to be cleaned out. Further, this device can be used as a live bait container since it can be towed along behind the boat and the openings 11 in the body 10 permit the water to flow freely into and out of the trap. The air chamber 20 enables the trap to float and by rotating the body member 10 the air within the trap can be displaced by water to cause the trap to sink. Thus, the necessity of using a net to catch bait or minnows is eliminated and any suitable bait can be placed inside of the trap, as for example bread crumbs. Any unused minnows can be returned alive into the river after the day's fishing is over.

When the trap floats, minnows on top of the water will be caught, and when the trap sinks, minnows or bait which are in the bottom of the river will be caught. A line can be arranged in engagement with the grooves 28 or apertures 27 whereby the trap can be turned over to the position shown in Fig. 4 from the position shown in Fig. 1, so that the trap can be lowered upside down or on its side into the water so that the water will rush in and cause the trap to sink. When the trap is to be floated in its most elevated position, the body member 10 is rotated or adjusted with respect to the end members 12 so that the apertures 21 are at the bottom of the trap and suitable lines can be connected to the apertured ears 24 for maintaining the trap on an even keel. When the trap is being used, a rope or line can be arranged in engagement with the openings 25 in the ears 24 and a suitable knot can be tied in the line. With the line tied to the ears 24 and with the trap in the position shown in Fig. 1, the trap will float, and this is true whether the openings 21 are positioned as shown in Fig. 1 or Fig. 2, it being understood that in Fig. 1 air can escape through the openings 21 so that less air will be trapped in chamber 20 than will be trapped in Fig. 2 where the level of water 31 is determined by the uppermost opening 11. Accordingly, variation of the position of openings 21 will vary the buoyancy of the trap.

While Fig. 1 illustrates a floating position, it will be appreciated that the attitude of the trap which is shown may be maintained when submerged and that the overturning or rotation of the trap is merely necessary to cause the same to be filled or substantially filled with water so that it can become submerged. Thus, when the trap is floating, and with the openings 21 positioned as shown in either of Figs. 1 or 2, when it is desired to cause the trap to sink, the lines can be trained around the trap to engage the openings 27 or 28 so that when the lines are pulled on, as illustrated by the line 40 in Fig. 4, the empty trap will rotate to admit water to enter the interior of the trap, whereby the trap will sink since the air in the trap will be replaced by the incoming water. The water line above the sinking trap in Fig. 4 is indicated by the numeral 32. It is to be understood that the wet line is heavier than the line in the dry condition so that the weight of the wet line in the water also has a tendency to make the trap sink. Furthermore, the current of the water will tend to turn the trap on its side when the line is arranged in engagement with the notches 28 so that water can be led into the interior of the trap to cause it to sink.

We claim:

1. In a minnow trap, a hollow body member, an end member positioned in engagement with each end of said body member and provided with a central opening therein for the egress therethrough of minnows, means detachably connecting said end members to said body member, the upper portion of said body member being provided with a float chamber, said float chamber being in communication with the remaining hollow portion of said body member, said body member being fabricated of a transparent material and having a plurality of openings therein, each of said end members being imperforate throughout with the exception of a plurality of apertures therein for selectively admitting air and water to said trap, said apertures being confined to a small portion of the periphery of said end members, and at least one pair of apertured ears extending from said hollow body member with one of said ears of each pair of ears being positioned at opposite ends of said hollow body member.

2. A minnow trap as defined in claim 1 in which said apertured ears comprise two pairs of apertured ears with the first pair mounted atop said float chamber and the second pair of ears being diametrically disposed with respect to said first pair of ears.

3. A minnow trap as defined in claim 2 in which said second pair of ears are provided with cut-out portions.

4. A minnow trap comprising a transparent hollow body member provided with a plurality of openings therein, the ends of said body member being open, an end member arranged in engagement with each end of said body member and including an inwardly converging portion provided with a central opening and an annular rim extending from said converging portion and surrounding a portion of said body member, each of said end members being imperforate with the exception of at least one aperture, said aperture being confined to a small portion of the periphery of said end members a resilient band interposed between said rim and body member, interengaging means on said rim and body member, there being an enlarged portion on said body member defining a float chamber, said float chamber being in communication with the remaining hollow portion of said body member, and a plurality of apertured lugs extending from said body member.

5. A minnow trap comprising a transparent hollow body member provided with a plurality of openings therein, the ends of said body member being open, an end member arranged in engagement with each end of said body member and including an inwardly converging portion provided with a central opening and an annular rim extending from said central portion and surrounding a portion of said body member, a resilient band interposed between said rim and body member, interengaging means on said rim and body member, said end members each being imperforate with the exception of a plurality of apertures therein, said apertures being grouped in one peripheral portion of said end members, there being an enlarged portion on said body member defining a float chamber, said float chamber being in communication with the remaining hollow portion of said body member, and a plurality of apertured lugs extending from said body member, said interengaging means comprising securing elements extending from said body member, and said rim having slots for receiving said securing elements.

6. The minnow trap as defined in claim 5 wherein the slots in said rim each have an L-shape.

7. In a minnow trap, a transparent hollow body member provided with a plurality of openings therein, the ends of said body member being open and being of cylindrical shape, an end member arranged in engagement with each end of said body member and including an inwardly converging portion provided with a central opening and an annular rim extending from the enlarged end of said inwardly converging portion, said rim surrounding a portion of said body member, a resilient band interposed between said rim and body member, there being an annular recess in each end of said body member for receiving said band, interengaging means on said rim and body member, said end members each having a plurality of apertures therein, said apertures being grouped in one peripheral portion of the end member, there being an enlarged portion on said body member defining a float chamber, said float chamber being in communication with the remaining hollow portion of said body member, said interengaging means comprising securing elements extending from said body member, said rim having slots for receiving said securing elements, said apertures being positioned in said converging portion adjacent said rim, the slots in said rim each having an L-shape, and a pair of lugs secured to said body member and positioned contiguous to the enlarged portion thereof.

8. In a minnow trap, a transparent hollow body member provided with a plurality of openings therein, the ends of said body member being open and being of cylindrical shape, said openings being disposed beneath the upper level of said open ends of said body member, an end member arranged in engagement with each end of said body member and including an inwardly converging portion provided with a central opening and an annular rim extending from the enlarged end of said inwardly converging portion, said rim surrounding a portion of said body member, a resilient band interposed between said rim and body member, there being an annular recess in each end of said body member for receiving said band, interengaging means on said rim and body member, said end members each having a plurality of apertures therein, said apertures being grouped in one peripheral portion of the body member, there being an enlarged portion on said body member defining a float chamber, said float chamber being in communication with the remaining hollow portion of said body member, said interengaging means comprising securing elements extending from said body member, said rim having slots for receiving said securing elements, said apertures being positioned in said converging portion adjacent said rim, the slots in said rim each having an L-shape, and a first pair of lugs secured to said body member and positioned contiguous to the enlarged portion thereof, and a second pair of lugs arranged diametrically opposite from said first pair of lugs and extending from said body member, each of said second pair of lugs having a central aperture therein, and there being a groove in each of said second lugs.

References Cited in the file of this patent

UNITED STATES PATENTS

| | | |
|---|---|---|
| 553,456 | Ferris | Jan. 21, 1896 |
| 616,924 | Heberling | Jan. 3, 1899 |
| 951,157 | Todd | Mar. 8, 1910 |
| 996,731 | Searles | July 4, 1911 |
| 1,903,276 | Yanga | Mar. 28, 1933 |
| 1,993,974 | McVicker | Mar. 12, 1935 |
| 2,023,311 | Davies | Dec. 3, 1935 |
| 2,111,959 | Baxter | Mar. 22, 1938 |
| 2,121,279 | Beck | June 21, 1938 |
| 2,361,321 | Schleier | Oct. 24, 1944 |
| 2,546,516 | Nardi | Mar. 27, 1951 |
| 2,551,236 | Bergman | May 1, 1951 |
| 2,644,269 | Ormesher | July 7, 1953 |
| 2,688,817 | Brune | Sept. 14, 1954 |